(12) United States Patent
Kitou et al.

(10) Patent No.: US 9,315,135 B2
(45) Date of Patent: Apr. 19, 2016

(54) VEHICLE SEAT

(71) Applicant: TOYOTA BOSHOKU KABUSHIKI KAISHA, Aichi-ken (JP)

(72) Inventors: Hidekazu Kitou, Aichi-ken (JP); Yushi Shinozaki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/306,565

(22) Filed: Jun. 17, 2014

(65) Prior Publication Data

US 2014/0375099 A1    Dec. 25, 2014

(30) Foreign Application Priority Data

Jun. 20, 2013   (JP) ................. 2013-129301

(51) Int. Cl.
| | |
|---|---|
| *A47C 7/02* | (2006.01) |
| *B60N 2/68* | (2006.01) |
| *B60N 2/48* | (2006.01) |

(52) U.S. Cl.
CPC .............. *B60N 2/682* (2013.01); *B60N 2/4808* (2013.01); *B60N 2/68* (2013.01)

(58) Field of Classification Search
CPC ........... B60N 2/68; B60N 2/682; B60N 2/686
USPC ........................................ 297/452.18, 452.2
See application file for complete search history.

(56) References Cited

U.S. PATENT DOCUMENTS

| | | | | |
|---|---|---|---|---|
| 5,131,721 A | * | 7/1992 | Okamoto | 297/452.18 |
| 5,547,259 A | * | 8/1996 | Fredrick | 297/452.18 |
| 7,530,633 B2 | * | 5/2009 | Yokota et al. | 297/216.12 |
| 8,876,214 B2 | * | 11/2014 | Kroener et al. | 297/452.18 |
| 2004/0113481 A1 | * | 6/2004 | Saberan et al. | 297/452.18 |
| 2004/0227389 A1 | * | 11/2004 | Yoshida | 297/452.18 |
| 2013/0069415 A1 | | 3/2013 | Yasuda et al. | |
| 2014/0084661 A1 | * | 3/2014 | Awata et al. | 297/452.18 |

FOREIGN PATENT DOCUMENTS

| | | |
|---|---|---|
| CN | 1819787 | 8/2006 |
| DE | 3839886 | 6/1989 |
| DE | 102010001025 | 7/2010 |
| EP | 2415631 | 2/2012 |
| JP | 07-059630 | 3/1995 |

(Continued)

OTHER PUBLICATIONS

Germany Office action, dated Jan. 8, 2015 along with an English translation thereof.

(Continued)

*Primary Examiner* — Laurie K Cranmer
(74) *Attorney, Agent, or Firm* — Greenblum & Bernstein, P.L.C.

(57) ABSTRACT

A vehicle seat includes: a seat cushion; a seatback; and a headrest. The seatback includes an upper frame and side frames. The side frame includes a side face portion, a first flange portion formed by bending a front side of the side face portion toward a seat inward side, and a second flange portion formed by bending a rear side of the side face portion toward the seat inward side. The upper frame is placed between the first flange portion and the second flange portion so as to be fixed to the flange portions, and the upper frame is connected to the side face portion, so that a relative movement between the upper frame and the side face portion is regulated.

7 Claims, 5 Drawing Sheets

(56) References Cited

FOREIGN PATENT DOCUMENTS

| | | |
|---|---|---|
| JP | 2002-337585 | 11/2002 |
| JP | 2009-136482 | 6/2009 |
| WO | 2012/091431 | 7/2012 |

OTHER PUBLICATIONS

Official Action, with partial English-language translation thereof, for CN Pat. App. No. 201410276689.0 having an issuance date of Dec. 30, 2015.

* cited by examiner

VEHICLE SEAT

INCORPORATION BY REFERENCE

The disclosure of Japanese Patent Application No. 2013-129301 filed on Jun. 20, 2013 including the specification, drawings and abstract is incorporated herein by reference in its entirety.

BACKGROUND OF THE INVENTION

1. Field of the Invention

The present invention relates to a vehicle seat including an upper frame (an upper framework of a seatback), plate-shaped side frames (side frameworks of the seatback), and a headrest on an upper part of the seatback.

2. Description of Related Art

As this type of vehicle seat, there has been known a vehicle seat described in Japanese Patent Application Publication No. 2009-136482 (JP 2009-136482 A). The vehicle seat includes a seatback rising from a seat cushion, and a headrest on an upper part of the seatback. A framework (a back frame) of the seatback includes an upper frame and paired side frames. The upper frame is a pipe material (a round steel pipe) having a generally reverse U shape and serving as an upper framework, and its central part is deformed in an upwardly projecting manner, so as to constitute a headrest. Further, each of the side frames is a plate-shaped member serving as a side framework, and an upper side thereof has a curved shape along an outer peripheral surface of the upper frame. In the publicly known technique, both bottom ends of the upper frame are fitted into upper parts of the side frames, and the frames are welded to be integrated with each other.

Here, in the field of the vehicle seat, in consideration that the round steel pipe is relatively expensive, the upper frame may be formed of a flat plate. For example, the upper frame is formed from a flat plate in a hollow box shape (a relatively cheap configuration), and is provided in a holder (a tubular material) in an inserted manner. A headrest stay (in a bar shape) projecting from a lower part of the headrest is provided in the holder in an inserted manner, so that the headrest is attached to an upper part of the seatback. Further, paired side frames are formed from a flat plate, and upper sides thereof are formed in a generally U shape in a traverse sectional view. A front side of each of the side frames is bent toward a seat inward side so as to form a first flange portion, and a rear side of the each of the side frames is bent toward the seat inward side so as to form a second flange portion. Then, the upper frame is placed between the paired side frames in a bridging manner, and each end of the upper frame is placed between the first flange portion and the second flange. Then, the each end of the upper frame is fixed to the flange portions, so that the upper frame can be fixed to the side frame.

SUMMARY OF THE INVENTION

In the meantime, in the field of the vehicle seat, in consideration that an occupant is pressed against the seat at the time of a vehicle collision, an improvement of a support performance of the side frames with respect to the upper frame has been expected. The present invention provides a vehicle seat that is able to improve the support performance of the side frames with respect to the upper frame.

A vehicle seat according to an aspect of the present invention includes: a seat cushion; a seatback connected to the seat cushion so that the seatback is able to rise therefrom; and a headrest attached to an upper part of the seatback in an upright state. The seatback includes an upper frame serving as an upper framework with respect to the upright state, and paired plate-shaped side frames serving as a side framework. In the present aspect, when an occupant head is pressed against the headrest, the upper frame may be pressed toward a seat rear side. However, in such a configuration, it is preferable that a support performance of the side frames with respect to the upper frame be improved.

Here, in the present aspect, each of the side frames includes a side face portion, a first flange portion formed by bending a front side of the side face portion toward a seat inward side, and a second flange portion formed by bending a rear side of the side face portion toward the seat inward side, with respect to the upright state. The upper frame is placed between the first flange portion and the second flange portion so as to be fixed to the flange portions. The upper frame is connected to the side face portion, so that a relative movement (generally, a relative movement in a seat front-rear direction) between the upper frame and the side face portion is regulated. In the present embodiment, it is possible to support the upper frame by the flange portions and the side face portion, thereby making it possible to regulate the rearward movement of the upper frame appropriately.

In the above aspect, the upper frame includes a first fixed portion fixed to the first flange portion, a second fixed portion fixed to the second flange portion, and a connection portion connected to the side face portion. At least one of a part of the upper frame which connects the first fixed portion to the connection portion, and a part of the upper frame which connects the second fixed portion to the connection portion may be placed so as to be separated from the side frame. In the present configuration, by reinforcing the side frame from its inside by the part of the upper frame which connects the first fixed portion (or the second fixed portion) to the connection portion, it is possible to prevent deformation of the side frame appropriately.

According to the above aspect, it is possible to improve a support performance of the side frame with respect to the upper frame. Further, according to the above aspect, it is possible to further improve the support performance of the side frame with respect to the upper frame.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes an embodiment for carrying out the present invention with reference to FIGS. 1 to 5. In each figure, a reference sign F is assigned to a vehicle-seat front side, a reference sign B is assigned to a vehicle-seat rear side, a reference sign UP is assigned to a vehicle-seat upper side, and a reference sign DW is assigned to a vehicle-seat lower side. A vehicle seat 2 in FIG. 1 includes a seat cushion 4, a seatback 6, and a headrest 8. These seat components each includes: a seat frame (4F, 6F, 8F) serving as a seat framework; a seat pad (4P, 6P, 8P) serving as a seat outer shape and supporting an occupant elastically; and a seat cover (4S, 6S, 8S) covering the seat pad. Here, the seatback 6 is connected to the seat cushion 4 so that the seatback 6 is able to rise and tilt with respect to the seat cushion 4. Further, the headrest 8 is attached to an upper part of the seatback 6 via paired headrest stays 8a (bar-shaped members).

Figure 1:
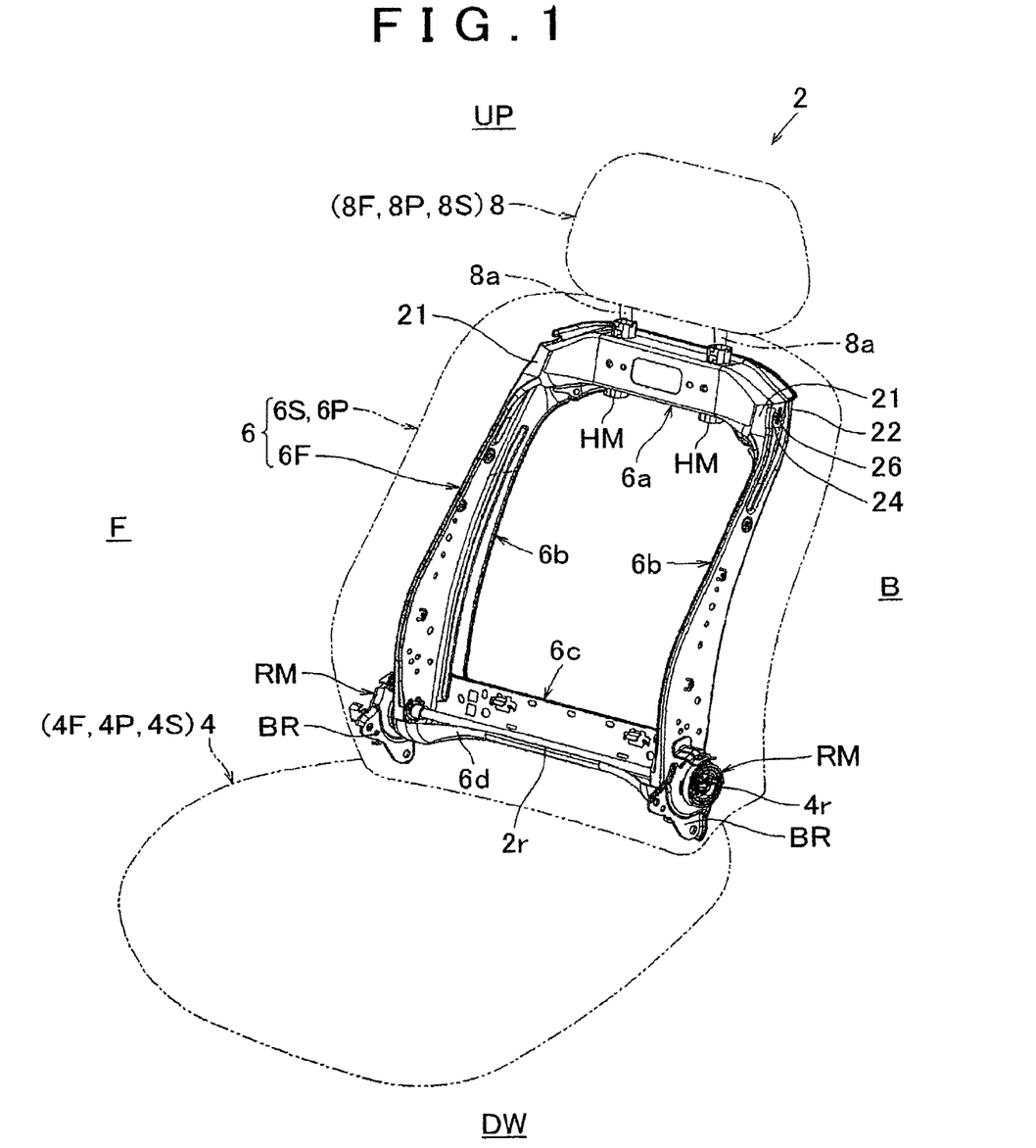
FIG. 1 is a partial perspective view of a vehicle seat.
Figure 2:
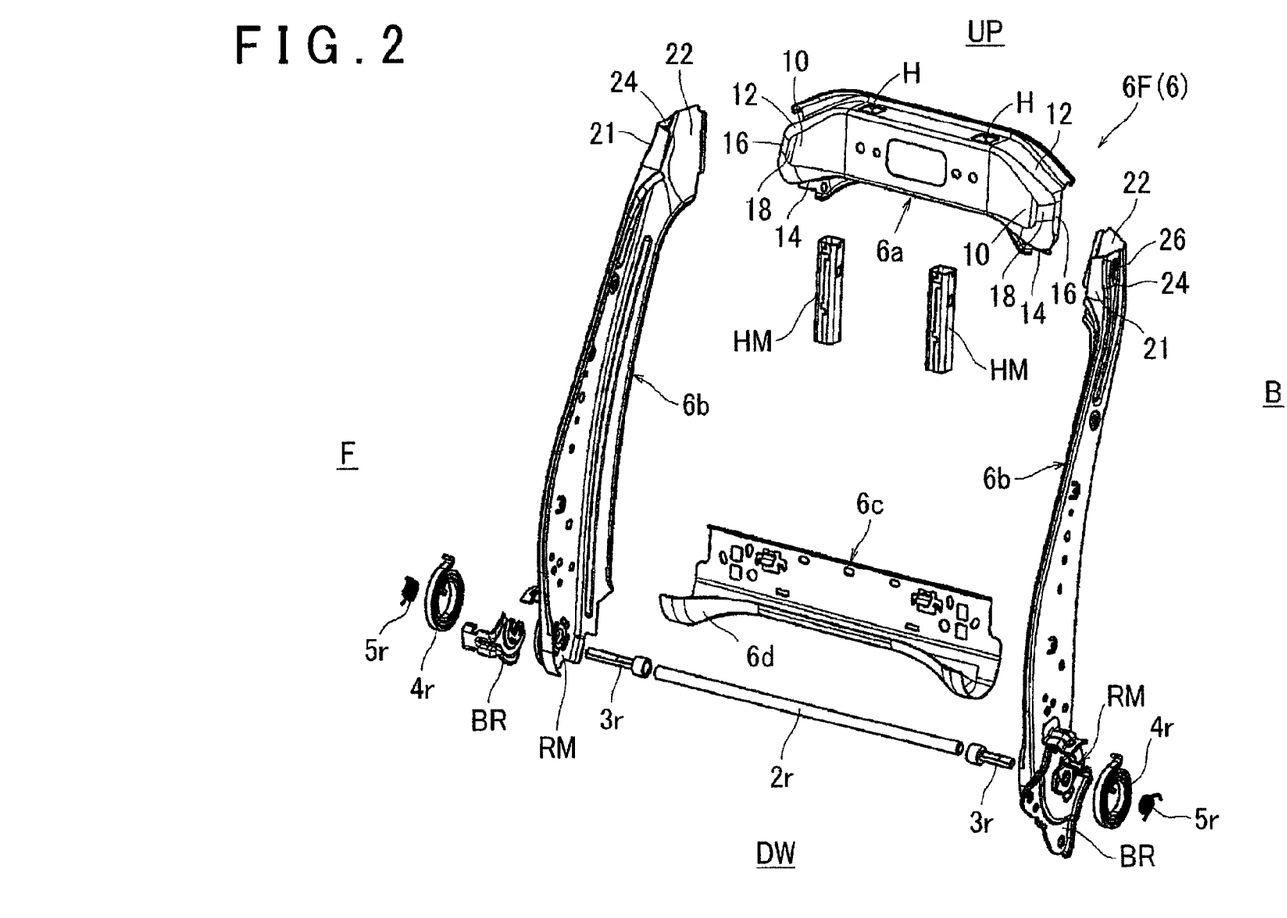
FIG. 2 is an exploded perspective view of a back frame.
Figure 3:
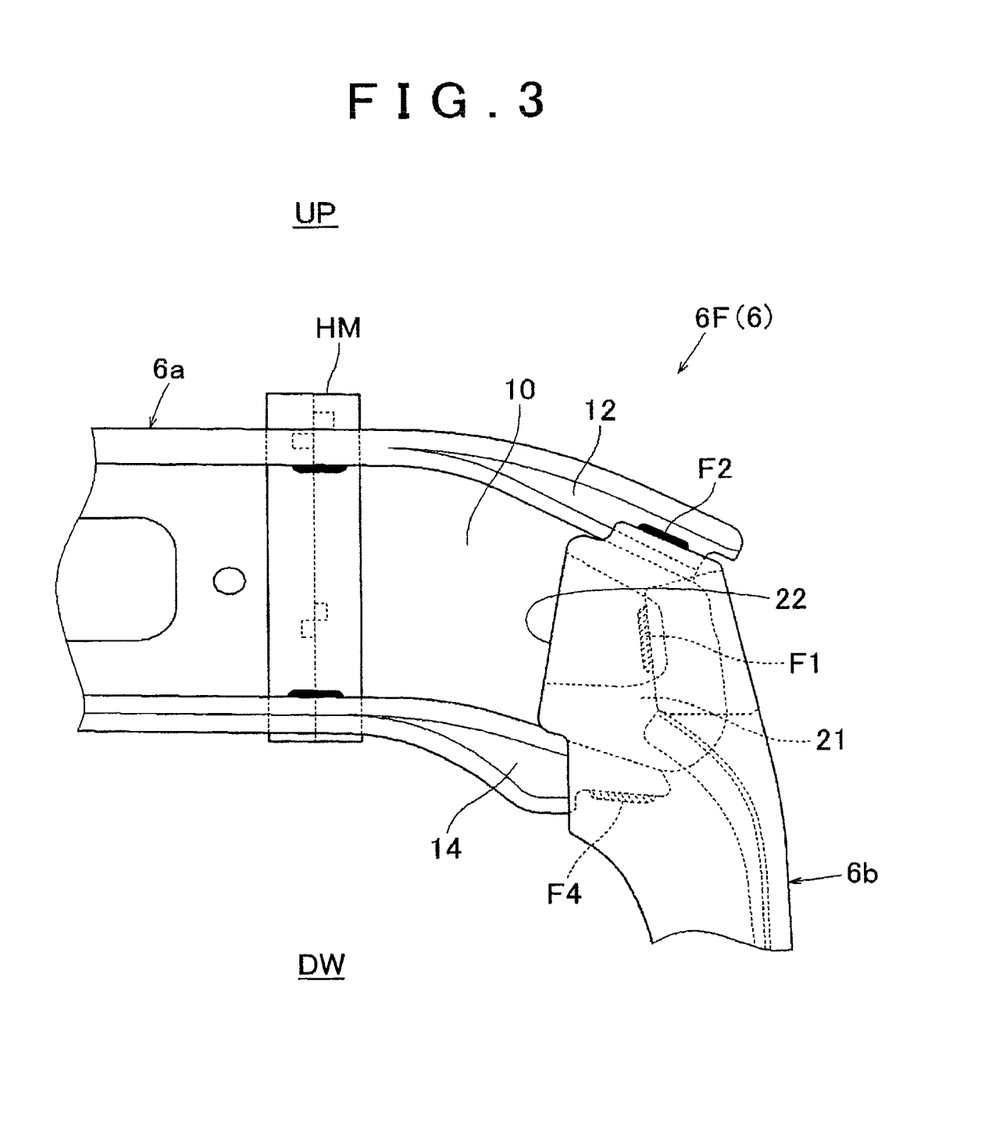
FIG. 3 is a front view of part of the back frame viewed from a rear side.
Figure 4:
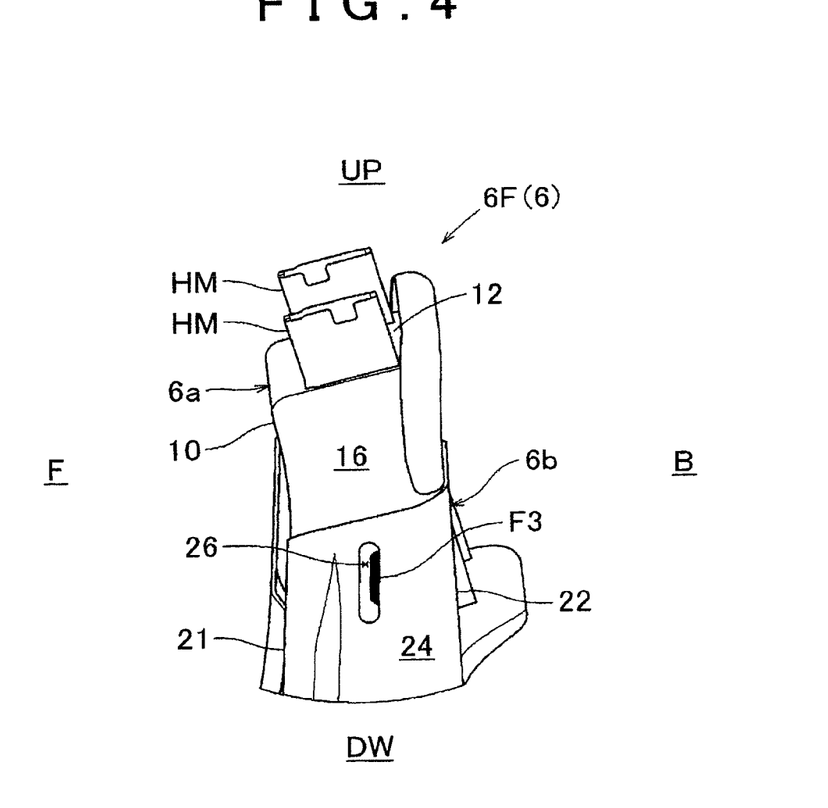
FIG. 4 is a side view of the part of the back frame.

In the present embodiment, the back frame 6F (metal) of the seatback 6 includes an upper frame 6a, paired side frames 6b, a lower frame 6c, and related constituents (holders HM, recliners RM) (see FIGS. 1 to 3). Here, the lower frame 6c is a plate-shaped member serving as a lower framework (having a generally rectangular shape in a front view), and is placeable in a bridging manner between the paired side frames 6b (described later). The lower frame 6c of the present embodiment has a generally lateral L shape (in a sectional view), and a lower part (a projection portion 6d) of the lower frame 6c projects toward a seat front side, and is disposed around the after-mentioned operating rod 2r (see FIG. 1).

Further, the upper frame 6a is a hollow box-shaped member (in a plate shape) serving as an upper framework, and is placeable in a bridging manner between the paired side frames 6b (described later) (see FIGS. 1 to 3). The upper frame 6a of the present embodiment has a hat-shaped section in which a rear side thereof is opened, and includes a plurality of portions (a sitting face portion 10, an upper face portion 12, a lower face portion 14, side end portions 16, and intermediate portions 18). Further, paired hole portions H are provided in the upper frame 6a at an appropriate interval in a seat-width direction so as to penetrate through the upper frame 6a in an up-down direction (see FIG. 2). Paired holders HM (relatively short tubular materials) are provided in the hole portions H of the upper frame 6a in an inserted manner, so that the headrest stays 8a are placed therein in an inserted manner (see FIG. 1).

The sitting face portion 10 is a generally flat part serving as a sitting side (front side) of the upper frame 6a, with respect to a state where the seatback rises (see FIGS. 2 to 5). Further, the upper face portion 12 is a part serving as an upper side of the upper frame 6a, and a seat rear side thereof is folded in a generally semicircular shape. Further, the lower face portion 14 is a part serving as a lower side of the upper frame 6a, and placed to so as to face the upper face portion 12. Further, the side end portions 16 are parts (generally flat) serving as side surfaces of both ends (both ends in the seat-width direction) of the upper frame 6a, and are provided so as to face side surfaces (side face portions 24) of the after-mentioned side frames 6b. Further, the intermediate portion 18 is a part of the upper frame which part connects the sitting face portion 10 to the side end portion 16. The intermediate portion 18 of the present embodiment has a protruding curved surface shape, and an outside dimension of the upper frame 6a in this portion is smaller than an outside dimension of the after-mentioned side frame 6b. In view of this, the intermediate portion 18 is placeable to be separated from the side frame 6b (an inner surface) in a state where the upper frame 6a is fixed to the side frame 6b.

The paired side frames 6b are plate-shaped members serving as respective side frameworks (see FIGS. 2 to 5). Each of the side frames 6b of the present embodiment has a generally lateral U shape (in a transverse sectional view), and includes a first flange portion 21, a second flange portion 22, and a side face portion 24 (a window portion 26). The side face portion 24 is a generally flat part serving as a side surface (a side surface in the seat-width direction) of each of the side frames 6b. Further, the window portion 26 is a hole portion penetrating through the side face portion 24 in a thickness direction (in a generally rectangular shape in a seat up-down direction), and is provided in an upper part of the side face portion 24 so that the upper frame 6a (the side end portion 16) can be exposed therefrom. The first flange portion 21 is a part serving as an upper front side of each of the side frames 6b with respect to a state where the seatback rises, and formed by bending a front side of the side face portion 24 toward a seat inward side in an orthogonal manner. Further, the second flange portion 22 is a part serving as an upper rear side of each of the side frames 6b, and formed by bending a rear side of the side face portion 24 toward the seat inward side in an orthogonal manner. Both of the flange portions 21, 22 are disposed so as to face each other via a predetermined gap (a clearance where the end of the upper frame 6a is insertable).

The recliner RM (a generally cylindrical member) is a member configured to regulate an rising and tilting operation of the seatback 6 relative to the seat cushion 4, and includes internal constituents (not shown), an operating rod 2r, and a biasing member 4r (see FIG. 2). The operating rod 2r is a pipe material elongated in the seat-width direction, and the biasing member 4r is a spiral spring-shaped member. In the present embodiment, the recliners RM are respectively fixed to the side frames 6b (to their lower parts), and are rotatably attached to respective bracket portions BR of the seat cushion 4 (a cushion frame 4F, which is not illustrated herein). Further, the operating rod 2r is placed between the lower parts (a front side of the lower frame 6c) of the paired side frames 6b in a bridging manner. In this state, both ends of the operating rod 2r are provided in an inserted manner into the recliners RM via respective bushes 3r so as to be rotatable around its axis. Subsequently, the biasing members 4r are attached to end parts (the bushes 3r) of the operating rod 2r via fastenings 5r, so as to bias the operating rod 2r in a direction where the operating rod 2r rotates in one direction. Then, the operating rod 2r rotates in the other direction against a biasing force of the biasing members 4r, so that the recliners RM (the internal constituents) are unlocked. Hereby, the seatback 6 is able to rise and tilt (rotate) relative to the seat cushion 4 with the recliners RM as a rotation center (e.g., the seatback 6 is able to tilt forward or rearward from an upright state in FIG. 1). Further, when the operating rod 2r rotates in the one direction due to the biasing force of the biasing members 4r, the recliners RM (the internal constituents) are locked, so that the rising and tilting operation of the seatback 6 relative to the seat cushion 4 is regulated.

Figure 5:
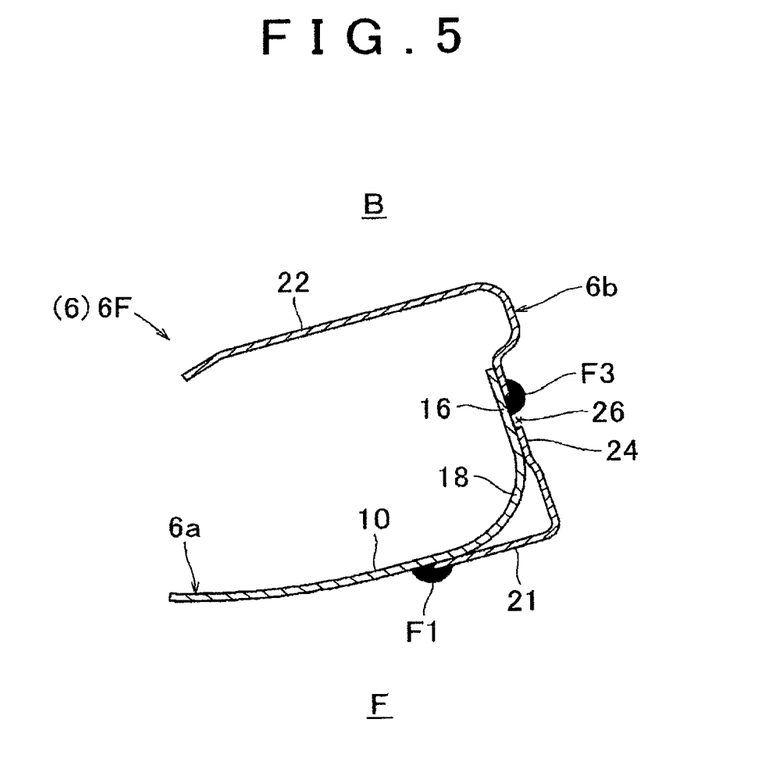
FIG. 5 is a sectional view of the part of the back frame.

Referring now to FIGS. 2 and 5, a plurality of frames 6a, 6b, 6c is welded so as to be integrated with each other, and related constituents are attached thereto. In the present embodiment, the lower frame 6c is placed between the paired side frames 6b (the lower parts) in a bridging manner, and then the frames are welded to be integrated with each other. Further, the upper frame 6a is placed between the paired side frames 6b (the upper parts) in a bridging manner. At this time, both ends of the upper frame 6a are each placed between the first flange portion 21 and the second flange portion 22, and a side surface (the side end portion 16) of the upper frame 6a is exposed from the window portion 26 of the side face portion 24 (see FIGS. 3 to 5).

Subsequently, with reference to FIG. 3, the first flange portion 21 is caused to make surface contact with the front side (the sitting face portion 10) of the upper frame 6a, and fixed thereto by welding (a first fixed portion F1 is formed). Further, the second flange portion 22 is fixed to a rear side of the upper frame 6a (the upper face portion 12 and the lower face portion 14) by welding (paired second fixed portions F2, F4 are formed). Further, referring to FIGS. 4 and 5, the upper frame 6a (the side end portion 16) is welded to an edge of the window portion 26 so as to connect the upper frame 6a to the side face portion 24 (a connection portion F3 is formed). At this time, in the present embodiment, a part (the intermediate portion 18) of the upper frame which connects the first fixed portion F1 to the connection portion F3 to the first fixed portion F1 is placed between the first flange portion 21 and the side face portion 24 in a bridging manner so as to be separated from the inner surface of the side frame 6b (see FIG. 5). After the fixed upper frame 6a is fixed to each of the side frames 6b as such, each of the headrest stays 8a is provided in an inserted manner into each of the holder HM, so that the headrest 8 is attached to the upper part of the seatback 6 (see FIG. 1).

In the abovementioned seat configuration, at the time of a vehicle collision, the headrest 8 tends to move to a seat rear side together with the upper frame 6a (due to an occupant head being pressed against the headrest 8) (see FIG. 1). At this time, it is desirable that a rearward movement of the headrest 8 be regulated appropriately by supporting the upper frame 6a by the side frames 6b. In view of this, in the present embodiment, the upper frame 6a is fixed to the side face portions 24 in a connected manner (to form the connection portions F3), so as to regulate a relative movement between these members (see to FIGS. 4 and 5). Thus, the upper frame 6a at the time of pressing is supported by the side face portions 24 (parts that are relatively hard to be deformed against a pressing force in a seat front-rear direction) as well as the flange portions 21, 22, thereby making it possible to prevent the rearward movement of the upper frame 6a appropriately. Further, in the present embodiment, the intermediate portion 18 is placed between the first flange portion 21 and the side face portion 24 in a bridging manner inside the side frame 6b (the intermediate portion 18 functions as a beam structure). By reinforcing the side frame 6b from its inside by the intermediate portion 18 as such, it is possible to prevent deformation of the side frame 6b (inclination deformation of the first flange portion 21) appropriately. Hereby, according to the present embodiment, a rearward movement of the headrest 8 is regulated appropriately by supporting the upper frame 6a by the side frames 6b.

As described above, in the present embodiment, it is possible to support the upper frame 6a by the flange portions 21, 22 and the side face portions 24, thereby making it possible to regulate the rearward movement of the upper frame 6a appropriately. Further, in the present embodiment, by reinforcing the side frame 6b from its inside by the part (the intermediate portion 18) of the upper frame which connects the first fixed portion F1 and the connection portion F3 as such, it is possible to prevent deformation of the side frame 6b appropriately. According to the present embodiment, it is possible to improve a support performance of the side frames 6b with respect to the upper frame 6a. Further, by improving the support performance of the side frames 6b, it is possible to restrain a rearward movement of the headrest 8 as well as the upper frame 6a, as much as possible.

The vehicle seat of the present embodiment is not limited to the above embodiment, and other various embodiments can be taken. The present embodiment deals with an example in which the upper frame 6a is connected to the side face portion 24 (the edge of the window portion 26) by welding, but is not intended to limit a connection method therebetween. For example, a projection portion is provided either one of the upper frame and the side face portion, so as to be connected to the other one of them by projection welding. Further, the side face portion may make surface contact with the upper frame, and laser beam welding may be performed thereto. Further, other than the welding, as a method for connecting the upper frame with the side face portion so as not to be relatively movable in the seat front-rear direction, there is such a physical fixing method as adhesion, caulking, engagement, fitting, bolt members, or the like.

Further, the present embodiment deals with an example in which the intermediate portion 18 having a projecting curved shape is placed so as to be separated from the side frame 6b (the inner surface), but is not intended to limit the configuration of the intermediate portion. The intermediate portion may take various shapes such as a linear shape (preferably, a shape linearly connecting the first fixed portion to the connection portion), a recessed curved shape, and the like. Further, a part (another intermediate portion) of the upper frame which connects the second fixed portion to the connection portion can be configured to be placed so as to be separated from an inner surface of the side frame. Further, both the intermediate portion and the another intermediate portion may be placed so as to be separated from the inner surface of the side frame. An outside dimension of the upper frame (a part where the intermediate portion is formed) may be adjusted in accordance with the outside dimension of the side frame, so that the intermediate portion (partially or entirely) abuts with the inner surface of the side frame.

Further, the present embodiment deals with an example of the upper frame 6a having a hat-shaped section (an opened-section structure), but is not intended to limit the configuration of the upper frame. For example, a rear side of the upper frame may be closed so as to have a closed-section structure. Further, the present embodiment deals with an example of the back frame 6F and the related constituents, but the configurations of these members are modifiable appropriately. For example, the lower frame may not be provided in the back frame (the back frame may be formed in an arch shape). Further, the side frames may be configured to be integrated with the lower frame in advance. Further, the side frame may be configured such that its upper side has a U shape (in a sectional view) and the other part has a pipe shape (a non-plate shape). The configuration of the present embodiment is applicable to various vehicle seats of a vehicle, an aircraft, an electric railcar, and the like.

what is claimed is:

1. A vehicle seat comprising:
   a seat cushion;
   a seatback connected to the seat cushion so that the seatback is configured to rotate relative to the seat cushion; and
   a headrest attached to an upper part of the seatback, wherein
   the seatback includes an upper frame serving as an upper framework and paired plate-shaped side frames serving as a side framework,
   the upper frame includes an upper face portion that faces toward an upward direction of the vehicle seat and a lower face portion that faces toward a downward direction of the vehicle seat,
   each of the side frames includes a side face portion, a first flange portion defined by a front side of the side face portion bent toward a seat inward side, and a second flange portion defined by a rear side of the side face portion bent toward the seat inward side,
   the upper frame is disposed between the first flange portions and the second flange portions, and the upper face portion and the lower face portion are fixed to the second flange portions at second fixed portions to prevent deformation of the side frame, and
   the upper frame is connected to the side face portions so that the upper frame is supported by the side framework when a force acts on the upper frame.

2. The vehicle seat according to claim 1, wherein
when the force is applied to a front side of the headrest, the upper frame is pressed toward a seat rear side.

3. The vehicle seat according to claim 2, wherein
the upper frame further includes first fixed portions fixing a sitting face portion of the upper frame to the first flange portions and connection portions fixing the side face portions to side end portions of the upper frame, and
at least one of a part of the upper frame which connects one of the first fixed portions to one of the connection portions, and a part of the upper frame which connects one of the second fixed portions to one of the connection portions is positioned so as to be separated from an inner surface of one of the side frames.

4. The vehicle seat according to claim 1, wherein
the upper frame further includes first fixed portions fixing a sitting face portion of the upper frame to the first flange portions, and connection portions fixing the side face portions to side end portions of the upper frame, and
at least one of a part of the upper frame which connects one of the first fixed portions to one of the connection portions, and a part of the upper frame which connects one of the second fixed portions to one of the connection portions is positioned so as to be separated from an inner surface of one of the side frames.

5. The vehicle seat according to claim 1, wherein
the upper frame is a hollow box-shaped member having an open rear side.

6. A vehicle seat comprising:
a seat cushion;
a seatback connected to the seat cushion so that the seatback is configured to rotate relative to the seat cushion; and
a headrest attached to an upper part of the seatback, wherein
the seatback includes an upper frame serving as an upper framework and paired plate-shaped side frames serving as a side framework,
the upper frame includes an upper face portion and a lower face portion,
each of the side frames includes a side face portion, a first flange portion defined by a front side of the side face portion bent toward a seat inward side, and a second flange portion defined by a rear side of the side face portion bent toward the seat inward side,
the upper frame is disposed between the first flange portions and the second flange portions, and the upper face portion and the lower face portion are fixed to the second flange portions at second fixed portions to prevent deformation of the side frame,
the upper frame is connected to the side face portions so that the upper frame is supported by the side framework when a force acts on the upper frame,
the upper frame further includes first fixed portions fixing a sitting face portion of the upper frame to the first flange portions, and connection portions fixing the side face portions to side end portions of the upper frame, and
at least one of a part of the upper frame which connects one of the first fixed portions to one of the connection portions, and a part of the upper frame which connects one of the second fixed portions to one of the connection portions is positioned so as to be separated from an inner surface of one of the side frames.

7. A vehicle seat comprising:
a seat cushion;
a seatback connected to the seat cushion so that the seatback is configured to rotate relative to the seat cushion; and
a headrest attached to an upper part of the seatback, wherein
the seatback includes an upper frame serving as an upper framework and paired plate-shaped side frames serving as a side framework,
the upper frame includes an upper face portion and a lower face portion,
each of the side frames includes a side face portion, a first flange portion defined by a front side of the side face portion bent toward a seat inward side, and a second flange portion defined by a rear side of the side face portion bent toward the seat inward side,
the upper frame is disposed between the first flange portions and the second flange portions, and the upper face portion and the lower face portion are fixed to the second flange portions at second fixed portions to prevent deformation of the side frame,
the upper frame is connected to the side face portions so that the upper frame is supported by the side framework when a force acts on the upper frame,
when the force is applied to a front side of the headrest, the upper frame is pressed toward a seat rear side,
the upper frame further includes first fixed portions fixing a sitting face portion of the upper frame to the first flange portions and connection portions fixing the side face portions to side end portions of the upper frame, and
at least one of a part of the upper frame which connects one of the first fixed portions to one of the connection portions, and a part of the upper frame which connects one of the second fixed portions to one of the connection portions is positioned so as to be separated from an inner surface of one of the side frames.

* * * * *